United States Patent [19]

Kisanuki

[11] Patent Number: 4,704,820
[45] Date of Patent: Nov. 10, 1987

[54] DOOR GLASS RUN FOR AUTOMOBILES
[75] Inventor: Hisayuki Kisanuki, Ichinomiya, Japan
[73] Assignee: Toyoda Gosei Co., Ltd., Nishikasugai, Japan
[21] Appl. No.: 865,834
[22] Filed: May 22, 1986
[30] Foreign Application Priority Data
  May 22, 1985 [JP] Japan .................. 60-75970[U]
[51] Int. Cl.$^4$ .............................................. E06B 7/16
[52] U.S. Cl. ............................... 49/441; 49/489
[58] Field of Search ................. 49/441, 440, 442, 444, 49/488, 489, 490, 491, 492, 438

[56] References Cited
U.S. PATENT DOCUMENTS

| | | | |
|---|---|---|---|
| 1,763,603 | 6/1930 | Donahue | 49/489 |
| 2,293,292 | 8/1942 | Goellner | 49/489 |
| 2,952,053 | 9/1960 | Frehse | 49/489 |
| 3,118,192 | 1/1964 | West | 49/489 |
| 3,286,389 | 11/1966 | Draplin et al. | 49/441 |
| 3,333,364 | 8/1967 | Herr | 49/441 |

Primary Examiner—Kenneth J. Dorner
Assistant Examiner—Gerald Anderson
Attorney, Agent, or Firm—Cushman, Darby & Cushman

[57] ABSTRACT

A door glass run for automobiles is provided with an inside lateral wall, a bottom wall and an outside lateral wall to constitute a glass-enclosing groove with U-shaped cross-section in its assembled state, i.e. when it is mounted to a run channel. The door glass run comprises a pulling-proof lip and a cover lip projected outward respectively from a base portion and a free end portion of at least one lateral wall and locked respectively to a rear surface and a front surface of a locking projection disposed to side of an aperture of the run channel. The pulling-proof lip has V-shaped cross-section and its top end portion is bent inward, and the parallel distance beteen the free end portions of the pulling-proof lip and the cover lip (at free state) is nearly equal to or slightly less than the width of the locking projection. Thereby when the glass run is inserted and assembled to the run channel the pulling-proof lip is securely locked to the locking projection, and after the assembling work has been completed, the glass run does not move forward and rearward in the inserting direction within the channel.

12 Claims, 6 Drawing Figures

DOOR GLASS RUN FOR AUTOMOBILES

BACKGROUND OF THE INVENTION

The present invention relates to a door glass run for automobiles.

A typical example of a door glass run in the prior art has sectional form as shown in FIGS. 1-2. In this example, an inside lateral wall 2, a bottom wall 4 and an outside lateral wall 5 constitute a glass-enclosing groove 1 with U-shaped cross-section in its installed state in a run channel 21. Pulling-proof lips 7, 7 are projected outward from a base portion of the inside lateral wall 2 and the outside lateral wall 5, and locked respectively to a rear surface of locking projections 22, 22 disposed on both sides of an aperture of the run channel 21. Cover lips 8, 8 are projected outward from top end portions of the inside lateral wall 2 and the outside lateral wall 5, and locked respectively to the front surface of the locking projections 22, 22. Thus the door glass run is formed in lateral symmetry. In the glass-enclosing groove 1, glass-pushing lips 10, 10 are projected respectively from top end portions of the inside lateral wall 2 and the outside lateral wall 5 and opposed to each other. On the surfaces of the glass-pushing lips 10, 10 and the bottom wall 4, in usual instances, urethane paint is coated or electrostatic blocking is performed so as to reduce the sliding resistance. The glass run is made by extrusion molding of rubber materials such as CR, EPDM or a plastic material with elasticity such as a PVC, polyolefin or the like.

In the glass run of the above-mentioned type in the prior art, the parallel distance d between top end portions of the pulling-proof lip 7 and the cover lip 8 is set so as to be considerably larger than the width D of the locking projection 22. If the parallel distance d is set nearly equal to the width D of the locking projection, since dimension variation in the parallel distance d and the width D is large, the dimension variation cannot be absorbed during the assembling and therefore assembling failure may occur as shown in regard to the pulling proof lip 7 at the left in the respective dash-and-dot line of FIG. 1.

Since the parallel distance d between top end portions of the lips is considerably larger than the width D of the engaging projection 22, the glass run can move forward and rearward in the inserting direction within the run channel 21 and therefore the cover lip 8 may be separated from front surface of the locking projection 22 as shown in FIG. 2, resulting in bad appearance in the assembled state. Further, a decrease of the sealing property results in leakage of water or invasion of noise as the automobile is travelling through the air.

SUMMARY OF THE INVENTION

A door glass run for automobiles of the invention, comprises an inside lateral wall, a bottom wall and an outside wall to constitute a glass-enclosing groove with U-shaped cross-section in its assembled state in a run channel, and a pulling-proof lip and a cover lip projected outward respectively from a base portion and a top end portion of at least one lateral wall and locked respectively to a rear surface and front surface of a locking projection disposed to one side of an aperture of the run channel. The pulling-proof lip has V-shaped cross-section and its free end portion is bent inward, and the parallel distance between the free end portions of the pulling-proof lip and the cover lip (in a free state, i.e. when not distorted by being installed in the run channel 21) is made nearly equal to or slightly less than the width of the locking projection.

In the door glass run for automobiles of the invention, since the pulling-proof lip has V-shaped cross-section and its free end portion is bent inward, and the parallel distance between the free end portions of the pulling-proof lip and the cover lip is made nearly equal to or slightly less than the width of the locking projection, when the glass run is inserted and assembled to the run channel the pulling-proof lip is securely locked to the locking projection, and after assembling work the glass run does not move forward and rearward in the inserting direction within the run channel.

Accordingly, there is no fear of the cover lip separating from the front surface wall of the locking projection of the run channel. Further, bad appearance in the assembled state of the glass run is not produced, and decrease of the sealing property which may result in leakage of water or invasion of noise as the automobile is travelling through the air is not produced.

DESCRIPTION OF THE PREFERRED EMBODIMENTS

Figure 1:
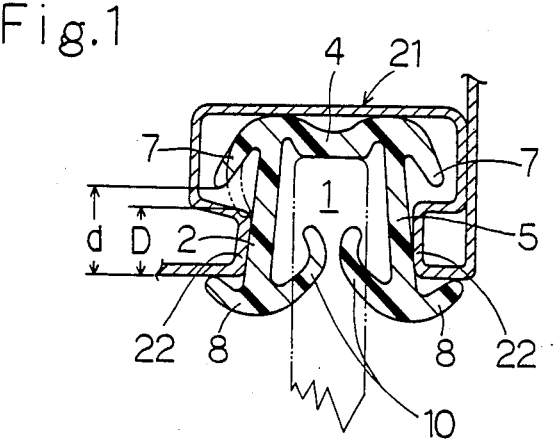
FIG. 1 is a cross-sectional view of a glass run in the prior art, in an assembled state, in normal position, but for the assembly failure indicated by a dash and dot line at the left.
Figure 2:
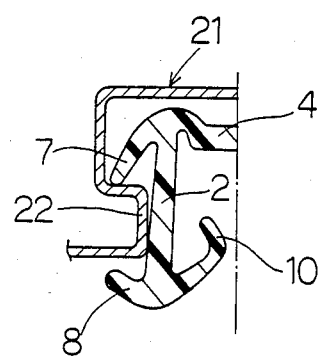
FIG. 2 is a fragmentary cross-sectional view of the glass run of FIG. 1, in an assembled state, with its position shifted towards the inserting direction, i.e. downward in FIG. 2.

Embodiments of a glass run of the invention will be described referring to FIGS. 3-6. Like parts to the run channel mounted glass run of the prior art which already has been described hereinabove in relation to FIGS. 1 and 2 are designated by the same reference numerals and a description of those parts shall not be reiterated.

Figure 3:
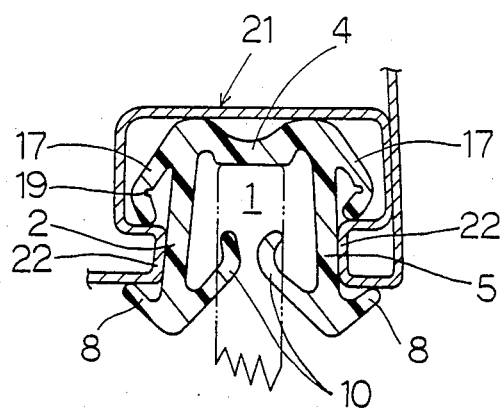
FIG. 3 is a cross-sectional view of a glass run as an embodiment of the invention in an assembled state.
Figure 4:
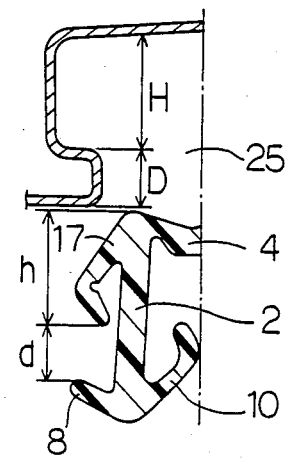
FIG. 4 is a fragmentary cross-sectional view of the elements shown in FIG. 3, prior to assembly thereof, illustrating the dimension relation of the glass run and the channel in its free state.
Figure 5:
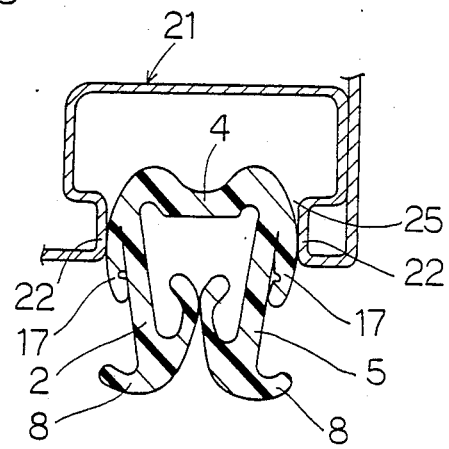
FIG. 5 is a cross-sectional view of the glass run in FIG. 3 just before finishing the assembling step.

Referring first to FIGS. 3-5, there is shown a glass run with a similar construction to the glass run of the prior art, except that there is provided a pulling-proof lip 17 which has V-shaped cross-section and its free end portion is bend inward, and the parallel distance d between the free end portions of the pulling-proof lip 17 and the cover lip 8 (when in the free state) is nearly equal to or slightly less than the width D of the locking projection 22. It is usually preferable that the difference D−d is 0.5-0 mm. The bending angle is usually made 60°-120° in the free state. Then, a notch 19 is preferably formed on inside of the bending portion as shown in the figures on account of hereinafter described reasons.

In this embodiment, the free height h of the pulling-proof lip 17 is slightly larger than the height H from the groove bottom of the run channel 21 to the lower surface of the locking projection 22. Of course, it is necessary that relation of $H+D \geq h+d$ is satisfied in order to make the cover lip 8 abut securely on the front surface of the locking projection 22. In the two equations set forth above:

D is the distance longitudinally between said internal and external shoulders of said wall portion of said laterally inner wall of said run channel, d is the distance longitudinally between said free end of said pulling-proof lip and said free end of said cover lip of said laterally inner wall of said glass run when said glass run is in a free state and undistorted by contact with said run channel, H is the distance longitudinally between said bottom wall of said run channel and said internal shoulder of said wall portion of said laterally inner wall of said run channel, internally of said U-shaped channel of said run channel, and h is the distance longitudinally between said bottom wall of said galss run and said free end of said pulling-proof lip of said laterally inner wall of said glass run, externally of said glass run, when said glass run is in a free state and undistorted by contact with said run channel.

In the assembling of the glass run of the embodiment, the glass run is first inserted to the run channel 21 as clearly seen in FIG. 3. The pulling-proof lips 17, 17 formed outward from the base portion of the glass run are pressed by both walls of a constricted aperture 25 of the run channel 21 in a stretched state, towards the inside lateral wall 2 and the outside lateral wall 5 and pass through the constricted aperture 25 as shown in the figures. If the bending portion is provided with the notch 19, the pulling-proof lip 17 can be easily stretched and therefore the inserting load does not increase appreciably.

The pulling-proof lips 17 pass through the constricted aperture 25 of the run channel 21, the glass run is forced until the cover lips 8 are subjected to elastic deformation, and then the pulling-proof lips 17 are opened to both sides by means of elastic force. Since free end portion of the pulling-proof lip 17 is bent inward, the pulling-proof lip 17 is securely locked to the rear surface of the locking projection 22. Moreover, since the parallel distance d between the free end portions of the pulling-proof lip 17 and the cover lip 8 is nearly equal to or slightly less than the width D of the locking projection 22, the locking projection 22 is grasped by the free end portions of both lips 17, 8 and therefore the glass run does not move forward and rearward in the inserting direction within the run channel 21. Since the bending portion of the pulling-proof lip 17 is provided with the notch 19, the free end side of the bending portion of the pulling-proof lip 17 can be easily bent inward and therefore the locking to the locking projection 22 becomes more secure.

Figure 6:
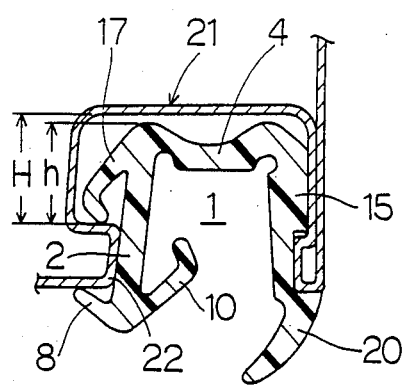
FIG. 6 is a cross-sectional view, in its assembled state, of a glass run of another embodiment of the invention.

FIG. 6 shows a glass run of another embodiment of the invention. In this embodiment, in order to make the respective glass surface flush with an outside lateral wall surface of the run channel, a glass-pushing lip 20 of an outside lateral wall 15 of the glass run is not bent inward but extends approximately linearly, and the invention is applied thereto. In the embodiment, the pulling-proof lip 17 and the cover lip 8 are formed only on the inside lateral wall 2. The height H from the groove bottom of the run channel 21 to the lower surface of the locking projection 22 is larger than the free height h of the pulling-proof lip 17 and therefore the bottom of the glass run does not abut on the groove bottom of the run channel 21. The mode of use of this embodiment is similar to that of the preceding embodiment.

As should be apparent, some terms such as "bottom", "height" which sometimes are used in other texts to denote particular directions or orientations, are used in a less rigorous sense herein, except as otherwise required by the context. For instance, with the run channel 21 oriented as shown in FIGS. 1-6, the element is uppermost which has been described as its "bottom", which is a correct designation of its function in relation to the mouth 22 of the channel 21. For convenience in description, the direction extending left to right in the drawing figures is termed the lateral direction, and the direction extending top to bottom in the drawing figures is termed the longitudinal direction.

What is claimed is:

1. An improved door glass run for assembly with an automotive door glass run channel including a laterally inner wall, a laterally outer wall spaced laterally from said laterally inner wall and in confronting relationship therewith, and a bottom wall extending between said laterally inner and laterally outer walls so as to define therewith a generally U-shaped groove having an opening between said laterally inner and outer walls remote from said bottom wall, said laterally inner and outer walls adjacent said opening being provided with wall portions which project towards one another but remain gapped from one another for effectively partially constructing said opening so as to provide respective internal shoulders which are disposed in longitudinally spaced confronting relationship with said bottom wall internally of said U-shaped groove and so as to provide respective external shoulders which are disposed in a longitudinally opposite direction to said internal shoulders on laterally opposite sides of said opening, said improved glass run being integrally formed of resilient material and comprising:
a laterally inner wall, a laterally outer wall spaced laterally from said laterally inner wall and in confronting relationship therewith, and a bottom wall extending between said laterally inner and outer walls of said glass run so as to define a generally U-shaped groove having an opening between said laterally inner and outer walls of said glass run remote from said bottom wall of said glass run;
a laterally projecting pulling-proof lip formed externally on said laterally inner wall of said glass run, so as to have a free end;
a laterally projecting cover lip formed externally on said laterally inner wall of said glass run, so as to have a free end;
said pulling-proof lip of said laterally inner wall of said glass run being based on this laterally inner wall at a location which is closer to said bottom wall of said glass run than is a location where said cover lip of said laterally inner wall of said glass run is based on this laterally inner wall;
respective longitudinally spaced confronting shoulders formed on said pulling-proof lip and said cover lip of said laterally inner wall of said glass run, these shoulders being spaced longitudinally apart, when said glass run is in a free state and undistorted by contact with said run channel, by a distance which is at least slightly less than the distance between said internal and external shoulders on said laterally inner wall of said run channel;

said pulling-proof lip and said cover lip of said laterally inner wall of said glass run projecting obliquely towards one another as they project laterally from said laterally inner wall of said glass run;

a first laterally projecting portion formed externally on said laterally outer wall of said glass run, so as to have a free end;

a second laterally projecting portion formed externally on said laterally outer wall of said glass run, so as to have a free end;

said first laterally projecting portion of said laterally outer wall of said glass run being based on this laterally outer wall at a location which is closer to said bottom wall of said glass run than is a location where said second laterally projection portion of said laterally outer wall of said glass run is based on this laterally outer wall;

respective longitudinally spaced confronting shoulders formed on said first and second laterally projecting portions of said laterally outer wall of said glass run;

a glass-pushing lip based on said laterally inner wall of said glass run adjacent said opening into said U-shaped channel of said glass run, this glass-pushing lip having a free end portion positioned for slidingly engaging a laterally inner surface of an automotive door glass sheet when such sheet is slid longitudinally into and out of said U-shaped channel of said glass run;

a glass-pushing lip based on said laterally outer wall of said glass run adjacent said opening into said U-shaped channel of said glass run, this glass-pushing lip having a free end portion positioned for slidingly engaging a laterally outer surface of said automotive door glass sheet when such sheet is slid longitudinally into and out of said U-shaped channel of said glass run;

said shoulders on said pulling-proof lip and said cover lip of said laterally inner wall of said glass run being positioned on said laterally inner wall of said glass run to receive longitudinally between them said internal and external shoulders of said wall portion of said laterally inner wall of said run channel;

said shoulders on said first and second laterally projecting portions of said laterally outer wall of said glass run being positioned on said laterally outer wall of said glass run to receive longitudinally between them said internal and external shoulders of said wall portion of said laterally outer wall of said run channel;

said free ends of said pulling-proof lip and said first laterally projecting portion of said laterally inner and outer walls of said glass run, when said glass run is in a free state and undistorted by contact with said run channel being disposed further apart in a transverse direction than the width of said opening of said U-shaped groove of said run channel as partially constricted by said wall portions which project towards one another, so that at least said pulling-proof lip of said glass run must be resiliently flexed in order to pushingly install said glass run into said run channel so that said pulling-proof lip is located longitudinally between said bottom wall of said run channel and said internal shoulder of said wall portion of said laterally inner wall of said run channel and said first laterally projecting portion of said laterally outer wall of said glass run is located longitudinally between said bottom wall of said run channel and said internal shoulder of said wall portion of said laterally outer wall of said run channel; and said pulling-proof lip being V-shaped in transverse cross-sectional shape, so that said free end thereof is provided on a portion thereof which projects obliquely in a medial direction from a base portion thereof which projects obliquely in a lateral direction.

2. The door glass run of claim 1, wherein:
said door glass run satisfies the equations:

$$D - d = 0.5 - 0 \text{ mm} \quad (1)$$

and $$H + D \geq h + d \quad (2)$$

in which:
D is the distance longitudinally between said internal and external shoulders of said wall portion of said laterally inner wall of said run channel, d is the distance longitudinally between said free end of said pulling-proof lip and said free end of said cover lip of said laterally inner wall of said glass run when said glass run is in a free state and undistorted by contact with said run channel, H is the distance longitudinally between said bottom wall of said run channel and said internal shoulder of said wall portion of said laterally inner wall of said run channel, internally of said U-shaped channel of said run channel, and h is the distance longitudinally between said bottom wall of said glass run and said free end of said pulling-proof lip of said laterally inner wall of said glass run, externally of said glass run, when said glass run is in a free state and undistorted by contact with said run channel.

3. The door glass run of claim 1, wherein:
said portion of said pulling-proof lip on which said free end thereof is provided projects at an angle of approximately 60 to 120 degrees to said base portion of said pulling-proof lip when said glass run is in a free state and undistorted by contact with said run channel.

4. The door glass run of claim 1, wherein:
said pulling-proof lip is notched between said portion thereof on which said free end thereof is provided and said base portion thereof on a side thereof which faces medially of said glass run.

5. The door glass run of claim 1, wherein:
said door glass run is laterally symmetrical in transverse cross-sectional shape and size about an imaginary centerline plane bisecting said bottom wall thereof.

6. The door glass run of claim 1, wherein:
said glass pushing lip of said laterally outer wall of said glass run projects approximately longitudinally in a direction away from said bottom wall of said glass run.

7. An improved automotive door glass run and run channel assembly, comprising:
an automotive door glass run channel including a laterally inner wall, a laterally outer wall spaced laterally from said laterally inner wall and in confronting relationship therewith, and a bottom wall extending between said laterally inner and laterally outer walls so as to define therewith a generally U-shaped groove having an opening between said laterally inner and outer walls remote from said bottom wall, said laterally inner and outer walls adjacent said opening being provided with wall portions which project towards one another but remain gapped from one another for effectively partially constructing said opening so as to provide respective internal shoulders which are disposed in longitudinally spaced confronting relationship with said bottom wall internally of said U-shaped groove and so as to provide respective external shoulders which are disposed in a longitudinally opposite direction to said internal shoulders on laterally opposite sides of said opening; and an improved glass run being integrally formed of resilient material and comprising:

a laterally inner wall, a laterally outer wall spaced laterally from said laterally inner wall and in confronting relationship therewith, and a bottom wall extending between said laterally inner and outer walls of said glass run so as to define a generally U-shaped groove having an opening between said laterally inner and outer walls of said glass run remote from said bottom wall of said glass run;

a laterally projecting pulling-proof lip formed externally on said laterally inner wall of said glass run, so as to have a free end;

a laterally projecting cover lip formed externally on said laterally inner wall of said glass run, so as to have a free end;

said pulling-proof lip of said laterally inner wall of said glass run being based on this laterally inner wall at a location which is closer to said bottom wall of said glass run than is a location where said cover lip of said laterally inner wall of said glass run is based on this laterally inner wall;

respective longitudinally spaced confronting shoulders formed on said pulling-proof lip and said cover lip of said laterally inner wall of said glass run, these shoulders being spaced longitudinally apart, when said glass run is in a free state and undistorted by contact with said run channel, by a distance which is at least slightly less than the distance between said internal and external shoulders on said laterally inner wall of said run channel;

said pulling-proof lip and said cover lip of said laterally inner wall of said glass run projecting obliquely towards one another as they project laterally from said laterally inner wall of said glass run;

a first laterally projecting portion formed externally on said laterally outer wall of said glass run, so as to have a free end;

a second laterally projecting portion formed externally on said laterally outer wall of said glass run, so as to have a free end;

said first laterally projecting portion of said laterally outer wall of said glass run being based on this laterally outer wall at a location which is closer to said bottom wall of said glass run than is a location where said second laterally projecting portion of said laterally outer wall of said glass run is based on this laterally outer wall;

respective longitudinally spaced confronting shoulders formed on said first and second laterally projecting portions of said laterally outer wall of said glass run;

a glass-pushing lip based on said laterally inner wall of said glass run adjacent said opening into said U-shaped channel of said glass run, this glass-pushing lip having a free end portion positioned for slidingly engaging a laterally inner surface of an automotive door glass sheet when such sheet is slid longitudinally into and out of said U-shaped channel of said glass run;

a glass-pushing lip based on said laterally outer wall of said glass run adjacent said opening into said U-shaped channel of said glass run, this glass-pushing lip having a free end portion positioned for slidingly engaging a laterally outer surface of said automotive door glass sheet when such sheet is slid longitudinally into and out of said U-shaped channel of said glass run;

said shoulders on said pulling-proof lip and said cover lip of said laterally inner wall of said glass run being positioned on said laterally inner wall of said glass run to receive longitudinally between them said internal and external shoulders of said wall portion of said laterally inner wall of said run channel;

said shoulders on said first and second laterally projecting portions of said laterally outer wall of said glass run being positioned on said laterally outer wall of said glass run to receive longitudinally between them said internal and external shoulders of said wall portion of said laterally outer wall of said run channel;

said free ends of said pulling-proof lip and said first laterally projecting portion of said laterally inner and outer walls of said glass run, when said glass run is in a free state and undistorted by contact with said run channel being disposed further apart in a transverse direction than the width of said opening of said U-shaped groove of said run channel as partially constricted by said wall portions which project towards one another, so that at least said pulling-proof lip of said glass run must be resiliently flexed in order to pushingly install said glass run into said run channel so that said pulling-proof lip is located longitudinally between said bottom wall of said run channel and said internal shoulder of said wall portion of said laterally inner wall of said run channel and said first laterally projecting portion of said laterally outer wall of said glass run is located longitudinally between said bottom wall of said run channel and said internal shoulder of said wall portion of said laterally outer wall of said run channel; and said pulling-proof lip being V-shaped in transverse cross-sectional shape, so that said free end thereof is provided on a portion thereof which projects obliquely in a medial direction from a base portion thereof which projects obliquely in a lateral direction;

said glass run being installed in said run channel so that said pulling-proof lip is located longitudinally between said bottom wall of said run channel and said internal shoulder of said wall portion of said laterally inner wall of said run channel and said first laterally projecting portion of said laterally outer wall of said glass run is located longitudinally between said bottom wall of said run channel and said internal shoulder of said wall portion of said laterally outer wall of said run channel.

8. The improved automotive door glass run and run channel assembly of claim 7, wherein:
said door glass run satisfies the equations:

$$D - d = 0.5 - 0 \text{ mm} \quad (1)$$

and $$H + D \geqq h + d \quad (2)$$

in which:
D is the distance longitudinally between said internal and external shoulders of said wall portion of said laterally inner wall of said run channel,
d is the distance longitudinally between said free end of said pulling-proof lip and said free end of said cover lip of said laterally inner wall of said glass run when said glass run is in a free state and undistorted by contact with said run channel,
H is the distance longitudinally between said bottom wall of said run channel and said internal shoulder of said wall portion of said laterally inner wall of said run channel, internally of said U-shaped channel of said run channel, and
h is the distance longitudinally between said bottom wall of said galss run and said free end of said pulling-proof lip of said laterally inner wall of said glass run, externally of said glass run, when said glass run is in a free state and undistorted by contact with said run channel.

9. The improved automotive door glass run and run channel assembly of claim 7, wherein:
said portion of said pulling-proof lip on which said free end thereof is provided projects at an angle of approximately 60 to 120 degrees to said base portion of said pulling-proof lip when said glass run is in a free state and undistorted by contact with said run channel.

10. The improved automotive door glass run and run channel assembly of claim 7, wherein:
said pulling-proof lip is notched between said portion thereof on which said free end thereof is provided and said base portion thereof on a side thereof which faces medially of said glass run.

11. The improved automotive door glass run and run channel assembly of claim 7, wherein:
said door glass run is laterally symmetrical in transverse cross-sectional shape and size about an imaginary centerline plane bisecting said bottom wall thereof.

12. The improved automotive door glass run and run channel assembly of claim 7, wherein:
said glass pushing lip of said laterally outer wall of said glass run projects approximately longitudinally in a direction away from said bottom wall of said glass run.

* * * * *